United States Patent Office 3,087,786
Patented Apr. 30, 1963

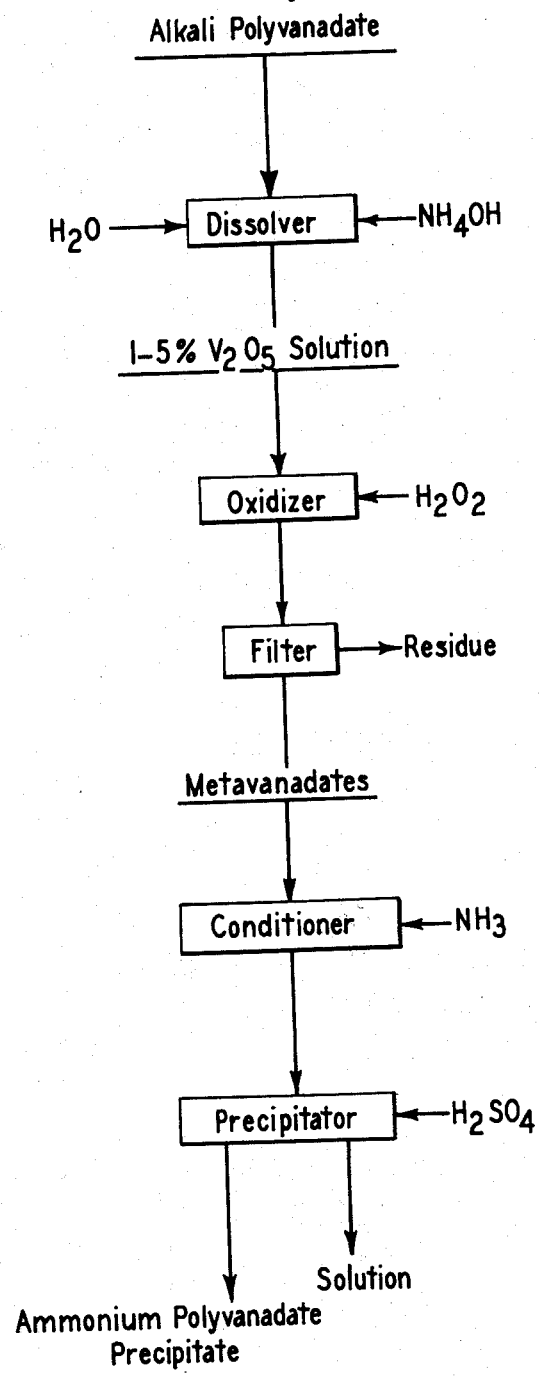

3,087,786
PREPARATION OF HIGH PURITY VANADIUM PENTOXIDE FROM OXIDIC VANADIUM MATERIALS
William P. Schoder, Denver, Colo., assignor to Union Carbide Corporation, a corporation of New York
Filed May 10, 1960, Ser. No. 28,108
6 Claims. (Cl. 23—140)

The present invention relates to the preparation of highly pure vanadium pentoxide from materials containing oxidic compounds of vanadium.

Heretofore, ore materials containing oxidic compounds of vanadium and uranium, such as carnotite ore, are treated by a salt-roasting procedure described in U.S. Patent 2,640,754 to A. Q. Lundquist. By this procedure, the ore material is intermingled with a salt, such as sodium chloride, and the mixture is roasted to convert the vanadium compounds to water-soluble alkali metavanadate and the uranium compounds to insoluble sodium uranate. The gross separation of vanadium from uranium values is effected by washing the roasted mass with water whereupon the vanadium values are recoverable from the wash liquor. By a procedure similar to that described and claimed in U.S. Patent 2,733,080 to A. Q. Lundquist, the wash liquor may then be treated with sulphuric acid under conditions which effect a precipitation of alkali polyvanadate (hexavanadate).

The alkali polyvanadate obtained by these procedures is known as "red cake." In one process it is heated in a fusion furnace to temperatures in excess of 800° C. thereby converting the polyvanadate to the anhydrous form. The alkali polyvanadate formed at these temperatures is fused and flaked for use in metallurgical processes, such as the production of ferrovanadium. Flaking of the fused vanadium pentoxide is effected by deposition on a cooled surface. The resultant flakes provide a very desirable high density product in fine form for ease of distribution in a metallurgical bath.

In such treatment, the resultant vanadium pentoxide salt is of relatively low purity and contains deleterious amounts of alkali metals such as sodium and potassium. The presence of such impurity metals is to be avoided where the vanadium pentoxide content is to be employed in the production of high purity alloys.

In one process for further refining this "red cake" to produce higher purity vanadium pentoxide than the mere heating of "red cake" will produce, the alkali polyvanadate is reacted with soluble ammonium salts to form vanadates which may be recovered in the form of a solid ammonium polyvanadate. This ammonium polyvanadate compound is washed to remove the soluble alkali salts. The ammonium polyvanadate compound is then heated to a sufficiently high temperature whereby ammonia is liberated and vanadium pentoxide is yielded. The product of this process, hereinafter referred to as the prior art process, yields a vanadium pentoxide of higher purity than that produced by merely heating alkali metal polyvanadates, but of not high enough purity for all metallurigcal purposes.

Specifically in its treatment of "red cake" (the alkali polyvanadate di-sodium hexavanadate which also contains some potassium hexavanadate) the prior art process calls for the introduction of the insoluble alkali polyvanadate into an aqueous suspension with addition of an approximately equivalent quantity of ammonium chloride or other soluble ammonium salt, whereby the ammonium salt is dissolved in the aqueous medium. After a treatment period of sufficient time for the reaction to proceed to substantial equilibrium (generally about 15 minutes), the solid reaction product is separated from the residual solution by filtration, decantation, or other means. It is to be noted that the alkali metal polyvanadate is washed with ammonium chloride in order to effect an ion-exchange of alkali metal for ammonium ion. The reaction is heterogeneous in that there is always a solid phase present. Furthermore the ammonium polyvanadate compound prepared by this process is flocculant while still in aqueous suspension thus presenting a large surface area for the occlusion of alkali impurity ions during the filtration and washing steps and the resulting product contains much alkali impurities.

The prior art process, therefore, repeats the same steps in order to obtain greater purity. Specifically, the separated solid product is again suspended in an aqueous medium, and again ammonium chloride or other soluble ammonium salt is added. After a second treatment period of about 15 minutes, the solid reaction product is separated by decantation, filtration, or the like from the residual liquor. Once more the solid reaction product is suspended in an aqueous medium, and a third quantity of ammonium chloride or other soluble ammonium salt is added. After allowing time for the reaction to proceed to substantial equilibrium (again about 15 minutes), the solid reaction product is separated from the solution. The separated solid product from this third step of the treatment may then be washed thoroughly, after which it is in condition for heating to dehydrate and to convert to vanadium pentoxide. It is to be noted that the ammonium polyvanadate compound prepared by the above-detailed prior art process is peptized when washed with pure water thus causing a loss of product due to the loss of vanadium in the wash water. Furthermore the ammonium polyvanadate produced has a poor crystalline condition being visually amorphous and possessing a crystal habit of the cryptocrystalline aggregates type rather than a discrete crystal type. The individual crystals of compound, which has a red-brown color, are very small and somewhat hygroscopic and tend to readsorb some moisture and agglomerate. Because of this amorphous consistency appreciable sodium remains in the cake in spite of repeated washings with ammonium chloride solutions. This sodium is then found in the vanadium pentoxide produced from the ammonium polyvanadate compound thereby lessening the usefulness of the vanadium pentoxide in applications where sodium, or the co-occurring impurity potassium is deleterious.

In addition, the ammonium polyvanadate upon heating yields a large proportion of $V_2O_4$ mixed in the $V_2O_5$. Since $V_2O_5$ is the desired product, the presence of the reduced vanadium as $V_2O_5$ amounts to a lowered yield.

It is, therefore, the prime object of the present invention to provide a method of producing vanadium pentoxide from ore materials containing oxidic compounds of vanadium wherein the resultant product is highly pure and especially free of alkali impurities.

It is another object of this invention to provide a method of producing vanadium pentoxide through the production of an ammonium polyvanadate which is free of alkali impurities.

It is another object of this invention to provide a method of producing vanadium pentoxide from ore materials containing oxidic compounds of vanadium through the production of a crystalline ammonium polyvanadate having good filterability properties whereby it is completely washed of impurities.

It is also an object of this invention to provide a method of producing vanadium pentoxide through the production of ammonium polyvanadate wherein the ammonium polyvanadate is produced in a homogeneous process thereby guaranteeing complete conversion of all alkali polyvanadates to ammonium polyvanadates.

It is another object of this invention to provide a method of producing vanadium pentoxide through the production of ammonium polyvanadate which process employs inexpensive reactants and involves a minimum of steps.

Other aims and advantages of the invention will be apparent from the following description and appended claims.

In accordance with the present invention, an oxidic vanadium material selected from the group consisting of alkali polyvanadates prepared in the manner indicated above and hydrous vanadium oxide is dissolved in ammoniated water to provide a solution containing between 1 and 5 percent vanadium pentoxide. The solution, where necessary, may be treated with a suitable oxidizing agent to insure that all contained vanadium is converted to the pentavalent state. The solution, containing the metallic values as metavanadates, is adjusted in ammonium ion content to provide an ammonium ion-combined alkali metal ion ratio of at least 2:1. Thereupon, the solution is adjusted in pH to a value of about 2 by the addition of an acid which forms water soluble salts of alkali metals, i.e., sodium and potassium and precipitates the vanadium as a crystalline ammonium polyvanadate (hexavanadate). The ammonium polyvanadate is then heated to drive off the ammonia and then to fuse the vanadium pentoxide.

It has been discovered that there exists at least two different forms of ammonium polyvanadate compound which are distinct polymorphs that approach similar compositions while having different crystalline forms. The ammonium polyvanadate compound produced by the prior art process is a poorly crystalline material being composed of aggregates of submicroscopic crystals which tend to readsorb moisture and impurities. This amorphous material is red in color and quite similar to the red alkali polyvanadate from which it was produced by the surface washing with ammonium salts as taught by the prior art process. The product of the process of this invention, however, is distinctly crystalline material having an orange color and being distinctly different from the red alkali polyvanadate starting material. This orange, crystalline ammonium polyvanadate has excellent filterability because of its large discrete crystals and yields a much purer vanadium pentoxide product than its polymorph as produced by the prior art process.

The occurrence of these distinct polymorphs which have similar compositions is believed to be due to the fact that the prior art process only surface treats the insoluble alkali polyvanadates in a solid state reaction whereas the process of this invention calls for the dissolution of these alkali polyvanadates in ammoniated water and then the precipitation of the crystalline ammonium polyvanadate from this homogeneous reaction.

In the preparation of materials suitable for use in the process of the present invention, an ore material containing an oxidic compound of vanadium, such as carnotite ore containing approximately 0.5 percent $U_3O_8$ and approximately 1.0 percent $V_2O_5$ as complex oxidic compounds of uranium and vanadium, may be ground and mixed with an alkali salt, such as sodium chloride, and the mixture roasted. The roasted ore material may be washed with water to dissolve the soluble vanadium compounds leaving the insoluble uranium compounds. The vanadium values may be precipittaed as alkali polyvanadates, such as di-sodium hexavanadate, from the wash liquor, by the addition of sulphuric acid thereto.

Specifically, the metal vanadate, such as sodium hexavanadate, is dissolved in ammonia and water in amounts required to give a solution having between 1 and 5 percent vanadium pentoxide content. The solution may be oxidized with a suitable oxidizing agent, such as sodium or hydrogen peroxide, to convert any quadravalent vanadium to pentavalent vanadium. The solution may then be filtered or clarified. The resulting solution containing vanadium as metavanadate has a pH of about 7 to 8 and is preferably treated at this stage to provide the presence of at least two ammonia ions for every alkali ion present.

This treatment may be effected by the addition of ammonium ions as ammonia, ammonium hydroxide, or water-soluble ammonium salts such as the sulphate, nitrate or chloride. This adjustment of the ammonia ion content by addition of ammonium salts, such as the chloride, is not the same as the prior art process wherein the insoluble alkali polyvanadate is treated in an aqueous suspension with ammonium chloride. In applicant's process the alkali polyvanadate is first dissolved in the ammoniated water rather than suspended in an aqueous medium, and then treated with ammonium salts. Applicant's process is homogeneous in that the alkali polyvanadate is dissolved in ammoniated water rather than the heterogeneous process of the prior art where the alkali polyvanadates are only suspended in the aqueous medium. Applicant's addition of ammonium salts is for the adjustment in ammonia ion content whereby all the alkali polyvanadate is converted to pure, crystalline ammonium polyvanadate.

The resulting metavanadate solution is heated to a temperature between 75 and 90° C. with continuous, but slow, agitation. The pH of the solution is then adjusted to a value of about 2.1 by the addition of an acid, such as sulphuric acid, nitric acid, hydrochloric acid, and the like, whereupon the alkali metal impurities, such as potassium and sodium are solubilized sulphates. The pH adjustment may be to a value just below about 2.2 and up to about 6.5, but a pH of 2.1 has been found satisfactory. The solution is then digested until the complete precipitation of the vanadium values as ammonium polyvanadate.

The resulting ammonium polyvanadate (hexavanadate) product is orange in color, has low water solubility, is finely crystalline and has excellent settling, filtering, and washing properties. It dries to the anhydrous salt at a temperature between 100 and 180° C. A typical purified ammonium polyvanadate product gives the following analysis:

91.07% $V_2O_5$
8.23% $(NH_4)_2O$
0.27% alkali oxides
0.013% S

This represents a salt of the composition $(NH_4)_2V_6O_{16}$ or $(NH_4)_2O \cdot 3V_2O_5$ with a theoretical composition of 91.29 percent $V_2O_5$ and 8.71% $(NH_4)_2O$.

The resultant ammonium polyvanadate product is then treated in a fusion furnace for conversion to high purity vanadium pentoxide. The product is subjected to a two-stage heating process. In the first step the temperature is elevated to between 190° C. and 400° C. under oxidizing conditions until the evolution of ammonia gas is complete. During this heating step the material is continuously agitated to permit the escape of evolved ammonia gas and produce vanadium pentoxide of high purity. Upon the completion of the evolution of ammonia gas, the temperature is raised in a second step to a value between about 670° C. and 950° C. to effect a fusion of the vanadium pentoxide.

It has been found that, under oxidizing conditions, the evolution of ammonia gas begins at approximately 190° C. Between this temperature and about 448° C. some pyrovanadate is formed. This compound is unstable, decomposing to water vapor and vanadium pentoxide which melts at 670° C. It has also been found that, at temperatures above 620° C. a secondary reaction takes place in the dissociation of the ammonia gas to form nitrogen and hydrogen. However, in the presence of $V_2O_5$ as a catalyst, this dissociation begins at 375° C.

In the absence of oxidizing conditions and the lack of movement of the material inhibiting the escape of evolved ammonia gas, the hydrogen produced by dissociation effects an undesirable reduction of vanadium pentoxide to vanadium tetroxide. In the presence of oxidizing conditions and continuous agitation, the ammonia polyvanadate can be completely converted to high purity vanadium pentoxide at a temperature of 400° C. The product of the prior art, however, contains a large percentage of reduced vanadium as $V_2O_4$.

It has also been found that, should the ammonia polyvanadate be rapidly subjected to temperatures in excess of 400° C. in the presence of carbon, a considerable amount of undesirable hydrocyanic gas is evolved in accordance with the following equations:

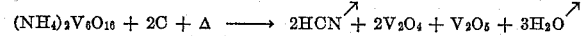

However, where ammonia is evolved by the slow application of heat, this reaction in the presence of carbon does not produce a significant amount of hydrocyanic gas unless a temperature in excess of about 400° C. is attained.

It has also been found that, when the furnacing operation of the invention is carried out at temperatures in excess of about 950° C., the vanadium pentoxide is reduced to vanadium tetroxide with the evolution of oxygen. The fusion step effected in the second stage of the furnacing operation of the invention should, therefore, be carried out at temperatures below about 950° C. to insure the production of highly pure vanadium pentoxide uncontaminated with vanadium tetroxide.

The single FIGURE of the drawing is a flow sheet showing the steps of the preferred chemical process aspect of the invention whereby ammonia polyvanadate is produced from alkali polyvanadate.

Referring specifically to the figure of the drawing, alkali polyvanadate (alkali hexavanadate), produced according to prior procedures and having a content of 6.15 percent $Na_2O$ and 1.10 percent $K_2O$, was dissolved in a medium of 18.9 grams of concentrated ammonium hydroxide and 700 ml. of water at 50° C. to give a solution containing between 1 and 5 percent $V_2O_5$, preferably a 4 percent $V_2O_5$ solution, and having a pH of about 8.0. The solution was introduced into an oxidizer and there treated with a suitable oxidizing agent, such as hydrogen peroxide or potassium permanganate. The resulting solution, consisting of metavanadates, was heated to 80° C. The solution was adjusted in ammonium ion content by the addition of ammonia until the preferred ammonium ion-to-alkali ion ratio of at least 2:1 was obtained. 11.3 grams of sulphuric acid was then added to the solution, which was maintained at a temperature above 75° C., to a pH of about 2.1, and the solution was digsted until ammonium polyvanadate (hexavanadate) was completely precipitated leaving a solution containing substantially water with some soluble alkali sulfates. The final pH rose to about 2.65. The ammonium polyvanadate precipitate was then filtered, washed with water and dried at 180° C. The total processing time, exclusive of drying was between 3 and 3½ hours. Ammonia consumption was 0.168 pound per pound of vanadium pentoxide and the sulphuric acid consumption was 0.358 pound per pound of vanadium pentoxide.

The analysis on a dry weight basis of the resulting ammonium polyvanadate was:

| | Percent |
|---|---|
| $V_2O_5$ | 90.68 |
| $Na_2O$ | 0.30 |
| $K_2O$ | 0.55 |
| $(NH_4)_2O$ | 7.81 |
| S | 0.16 |

In an even further purification of this product the chemical processing was repeated by redissolving the ammonium polyvanadate in 700 ml. of water containing 18.9 grams of concentrated ammonium hydroxide, at a temperature of 80° C., then adjusting to a pH of 2.2 with 11.3 grams of sulfuric acid, and digesting with agitation until the purified ammonium polyvanadate was completely precipitated.

The purified compound was filtered from the solution, washed with cold water and dried at 180° C. to give the following product by analysis:

| | Percent |
|---|---|
| $V_2O_5$ | 91.07 |
| $Na_2O$ | 0.02 |
| $K_2O$ | 0.25 |
| $(NH_4)_2O$ | 8.23 |
| S | 0.013 |

Three batches of unpurified ammonium polyvanadate precipitates, produced using $Na_2O_2$ for oxidation, analyzed as follows:

| | Percent | | |
|---|---|---|---|
| $V_2O_5$ | 90.58 | 89.77 | 89.99 |
| $Na_2O$ | 0.16 | 0.25 | 0.20 |
| $K_2O$ | 1.31 | 1.72 | 1.12 |
| S | 0.018 | 0.073 | 0.069 |
| | 91.97 | 91.81 | 91.38 |

In an example of the two-step fusion furnacing aspect of the invention, a sample of ammonium polyvanadate was heated in the furnace to 400° C. and stirred in an oxidizing atmosphere until the ammonium content was volatilized.

Ammonium polyvanadate analysis:

| | Percent |
|---|---|
| $V_2O_5$ | 90.68 |
| $Na_2O$ | 0.30 |
| $K_2O$ | 0.55 |
| $(NH_4)_2O$ | 7.81 |
| S | 0.16 |

Heated product analysis:

| | Percent |
|---|---|
| $V_2O_5$ | 99.42 |
| $Na_2O$ | 0.28 |
| $K_2O$ | 0.52 |
| $(NH_4)_2O$ | 0.084 |
| S | 0.014 |

The temperature of the furnace was raised to 700° C. and the molten $V_2O_5$ poured out on a cooled plate to form a flaked product which had the following analysis:

| | Percent |
|---|---|
| $V_2O_5$ | 99.10 |
| $Na_2O$ | 0.30 |
| $K_2O$ | 0.55 |
| $(NH_4)_2O$ | Nil |
| S | 0.0096 |

It was found that the unfused density of the product was 122.6 cubic inches per pound.

In another example of the invention a comparison of the prior art process and the process of this invention was made. Using the same alkali polyvanadate in the process of the prior art and in applicant's process, the improvements in yield, purity and simplicity of process inherent in applicant's process over that of the prior art are seen. The steps and composition of reactants are given, first for the prior art process and then for applicant's process, which is called the "orange cake" process.

Prior Art Process

A 50 gram specimen of Anaconda "red cake," an alkali polyvanadate, containing 89.54 percent $V_2O_5$, or 44.77 grams $V_2O_5$, and 0.01% sulfur, and 0.02 percent insolubles and the balance alkalis was agitated at 70° C. for 15 minutes with 8.73 grams of $NH_4Cl$ (0.195 gram of $NH_4Cl$ per gram of $V_2O_5$) and 122.3 ml. of water (71.4 grams $NH_4Cl$ per liter). The slurry was filtered and retreated twice more with the same concentration of ammonium chloride and for the same time and temperature.

The final slurry resulting from the three treatments was washed with warm water. The filtrates and wash water, amounting to 1500 ml. contained 0.007 percent $V_2O_5$ or a loss of 0.105 gram $V_2O_5$ because of peptization of the ammonium polyvanadate compound.

The ammonium polyvanadate filter cake was dried and first heated in the oven for 60 hours at 200° C. to eliminate water leaving a 48.4 gram "red cake" ammonium polyvanadate product having the following analysis:

91.73% $V_2O_5$=44.40 grams
2.23% $Na_2O$
0.38% $K_2O$

The composition of this "red cake" ammonium polyvanadate is reported as $(NH_4)_2V_6O_{16}$ but actually there is a decomposition of the compound to $V_2O_5$ at this point which is evidenced by the odor of $NH_3$ in the oven and the alkaline reaction of the vapors evolve. This explains the fact that the $V_2O_5$ content of this compound is reported as 91.73 percent which is too high for a "red cake" product unless there has been a loss in weight due to ammonium breakdown as well as loss of water. There is also a reduction of vanadium to $V_2O_4$ at this time.

This product was then heated for 4 hours in a furnace at 300° C. leaving a 44.9 gram product having the following analysis:

88.03% $V_2O_5$
8.34% $V_2O_4$ combined $V_2O_5$
and $V_2O_4$ as $V_2O_5$=97.17%=43.63 grams
2.76% $Na_2O$
0.38% $K_2O$
<0.01% $R_2O_3$=$NH_3$ group The recovery or yield was thus 97.45 percent.

"ORANGE CAKE" PROCESS OF THIS INVENTION

A 50 gram specimen of the same Anaconda "red cake" used before containing 89.54 percent $V_2O_5$, or 44.77 grams, and 0.01 percent sulfur, and 0.02 percent insolubles, and the balance alkalis was dissolved in 29.4 ml. of concentrated $NH_4OH$ in 1200 ml. of water at 60° C. with stirring. The vanadium was air oxidized by continued stirring on the alkaline side of the pH range. The water white solution was filtered from the slight amount of insoluble and $NH_3$ group elements.

The clear solution was then adjusted to pH of 2.1 with 16 ml. of 1:1 sulfuric acid and digested at 80° C. with stirring for 1½ hours until precipitation of ammonium polyvanadate was complete. The ammonium polyvanadate, or "orange cake," was then filtered and washed with cold water.

The "orange cake" filtrate of 1560 ml. contained 0.003 percent $V_2O_5$, or a loss of only 0.047 gram of $V_2O_5$ in washing.

The "orange cake" ammonium polyvanadate weighed 49.3 grams and had the following analysis:

90.45% $V_2O_5$=44.59 grams
0.05% $Na_2O$
0.40% $K_2O$

The "orange cake" was then heated in the furnace at a temperature just under 400° C. for 4 hours and gave the product having the following analysis:

97.63% $V_2O_5$
1.18% $V_2O_4$ combined $V_2O_5$
and $V_2O_4$ as $V_2O_5$=98.81%=44.56 grams
0.04% $Na_2O$
0.42% $K_2O$ The recovery or yield was thus 99.53 percent.

The ammonium polyvanadate products prepared by the prior art process and the "orange cake" process of this invention were examined and compared by X-ray diffraction and infrared spectra analysis.

The X-ray powder patterns for the "orange cake" and the "red cake" product of the Prior Art process are visibly different from one another. Major diffraction peaks are present in the "orange cake" pattern which are absent from the pattern of the "red cake," and are indicative of differences in crystal structure between the two materials. The characteristics of diffraction peaks in the pattern of the "red cake" are also very broad and diffuse, reflecting the poor crystalline condition of this "red cake" production of the prior art in comparison to the crystalline "orange cake."

While the composition of the "red cake" ammonium polyvanadate approaches the composition of the "orange cake" ammonium polyvanadate compound, the "red cake" product does not convert to the crystalline structure of the orange polyvanadate. The two compounds are distinct polymorphs that approach similar compositions while retaining different crystalline forms.

Infrared spectra for both materials give further indication that the "red cake" product is a distinct polymorph of the "orange cake" compound, and that "orange cake" may be considered a different crystalline compound with distinctive physical and chemical properties.

Further tests were made comparing the final $V_2O_5$ products of the prior art process and the process of this invention. An X-ray diffraction pattern for the "orange cake" product heated to 400° C. is in close agreement with standard X-ray diffraction data for pure $V_2O_5$. In contrast the "red cake" product heated to 300° C. shows appreciable amounts of impure phases including $V_2O_4$ and a high temperature sodium polyvanadate corresponding closely to the composition of $Na_2O \cdot 5V_2O_5$.

In Table 1 a comparison of the prior art process and applicant's "orange cake" process is given in terms of reagents, grade, yield, and type of product.

TABLE 1

Comparison of Prior Art "Red Cake" Process and the "Orange Cake" Process of This Invention

|  | "Red Cake" process | "Orange Cake" process |
| --- | --- | --- |
| Consumption of $NH_4Cl$, lb. per lb. of $V_2O_5$. | 0.585 |  |
| Consumption of $NH_3$, lb. per lb. of $V_2O_5$. |  | 0.168. |
| Consumption of $H_2SO_4$, lb. per lb. of $V_2O_5$. |  | 0.358. |
| Ammonium polyvanadate formed: |  |  |
| Type reaction | Ion-exchange | Dissolution and precipitation. |
| Color | Red | Orange. |
| Consistency | Amorphous | Crystalline. |
| Composition | (¹) | $(NH_4)_2V_6O_{16}$. |
| Grade, percent $V_2O_5$ | 91.73 ² | 90.45. |
| Filterability | Fair to poor | Excellent. |
| Loss by peptization | High | Low. |
| $V_2O_5$ product formed: |  |  |
| Color | Green | Tan. |
| Grade, percent $V_2O_5$ | 97.17 | 98.81. |
| Alkali content | 3.14 | 0.46. |
| Reduced V as $V_2O_4$ | 8.34 | 1.08. |
| Yield | 97.45 | 99.53. |

¹ Reported as $(NH_4)_2V_6O_{16}$ but not certain.
² It is believed that there is a breakdown to $V_2O_5$ and $V_2O_4$ at this point, which is the reason for the large amount of $V_2O_4$ in the final product.

In view of the distinctions shown in the table, it is apparent that applicant has provided a new and different process for producing high purity vanadium pentoxide and that this process constitutes a valuable contribution to the metallurgical art.

While the invention has been described with particular reference to the treatment of alkali polyvanadate derived from a specific treatment of vanadium-containing ore materials, it is of course to be understood that, in its broader aspects, the invention is equally applicable to the treatment of other oxidic vanadium-containing materials however derived.

This application is a continuation-in-part of my co-pending application Serial No. 661,451, filed May 24, 1957, now abandoned.

What is claimed is:

1. A process for the production of ammonium polyvanadate, capable of conversion to vanadium pentoxide, from alkali polyvanadate which comprises providing the dissolution of said alkali polyvanadate in ammoniated water to form a solution containing vanadium pentoxide in a concentration of between 1 percent and 5 percent by weight and an ammonium ion-to-combined contained alkali metal ion ratio of at least 2 to 1; adjusting the pH of the resultant solution to about 2.1 by the addition of an acid which forms water soluble salts of alkali metals, to precipitate an ammonium hexavanadate and separating said precipitate from the resulting solution.

2. A process for the production of ammonium polyvanadate, capable of conversion to vanadium pentoxide, from alkali polyvanadate which comprises providing the dissolution of said alkali polyvanadate in ammoniated water to form a solution containing vanadium pentoxide in a concentration of between 1 percent and 5 percent by weight and an ammonium ion-to-combined contained alkali metal ion ratio of at least 2 to 1; adjusting the pH of the resulting solution to a value between about 2 to 6.5 by the addition of an acid which forms water soluble salts of alkali metals, to precipitate ammonium hexavanadate and separating said precipitate from the resulting solution.

3. In the production of vanadium pentoxide from alkali polyvanadate, the improvement which comprises forming an ammoniated aqueous solution of said alkali polyvanadate having a contained vanadium oxide content between about 1 percent and 5 percent by weight, adjusting the pH of the resultant solution to a value below about 2.1 by the addition of an acid which forms water soluble salts of alkali metals and an ammonium hexavanadate precipitate; and separating said precipitate from the resulting solution.

4. A process for the production of very highly pure ammonium polyvanadate, capable of conversion to vanadium pentoxide, from alkali polyvanadate which comprises providing the dissolution of said alkali polyvanadate in ammoniated water to form a solution containing vanadium pentoxide in a concentration of between 1 percent and 5 percent by weight and an ammonium ion-to-combined contained alkali metal ion ratio of at least 2 to 1; adjusting the pH of the resultant solution to a value below about 2.1 by the addition of an acid which forms water soluble salts of alkali metals, to precipitate an ammonium hexavanadate, separating said precipitate from the resulting solution; and repeating said providing, adjusting and separating steps at least once on said precipitate to provide a very highly pure crystalline ammonium hexavanadate product.

5. In the production of vanadium pentoxide from alkali polyvanadate, the improvement which comprises forming an ammoniated aqueous solution of said selected material; adjusting the pH of said solution to a value below about 2.1 by the addition of an acid which forms water soluble salts of said contained alkali metal values; and a highly pure ammonium hexavanadate precipitate; effecting a separation of said precipitate from the resulting solution; and heating said precipitate under oxidizing conditions to a temperature between 190° C. and 400° C., while continuously agitating to evolve ammonia gas and produce vanadium pentoxide.

6. In the production of vanadium pentoxide from alkali polyvanadate, the improvement which comprises forming an ammoniated aqueous solution of said selected material; adjusting the pH of said solution to a value below about 2.1 by the addition of an acid which forms water soluble salts of the alkali metal values and to form a highly pure ammonium hexavanadate precipitate; effecting a separation of said precipitate from the resulting solution; heating said precipitate under oxidizing conditions to a temperature between 190° C. and 400° C., which continuously agitating to evolve ammonia gas and produce vanadium pentoxide; fusing the resulting highly pure vanadium pentoxide by heating to a temperature between 670° C. and 950° C.; and quickly cooling the fused material to produce a flaked vanadium pentoxide product.

References Cited in the file of this patent

UNITED STATES PATENTS

| 2,298,091 | Cooper | Oct. 6, 1942 |
| 2,357,466 | Frick | Sept. 5, 1944 |
| 2,357,488 | Nelson | Sept. 5, 1944 |
| 2,628,154 | Perrin et al. | Feb. 10, 1953 |

OTHER REFERENCES

Mellor: "Comprehensive Treatise on Inorganic and Theoretical Chemistry," Longmans, Green and Co., N.Y., 1929, vol. 9, pages 758 and 759.